Figure 1:
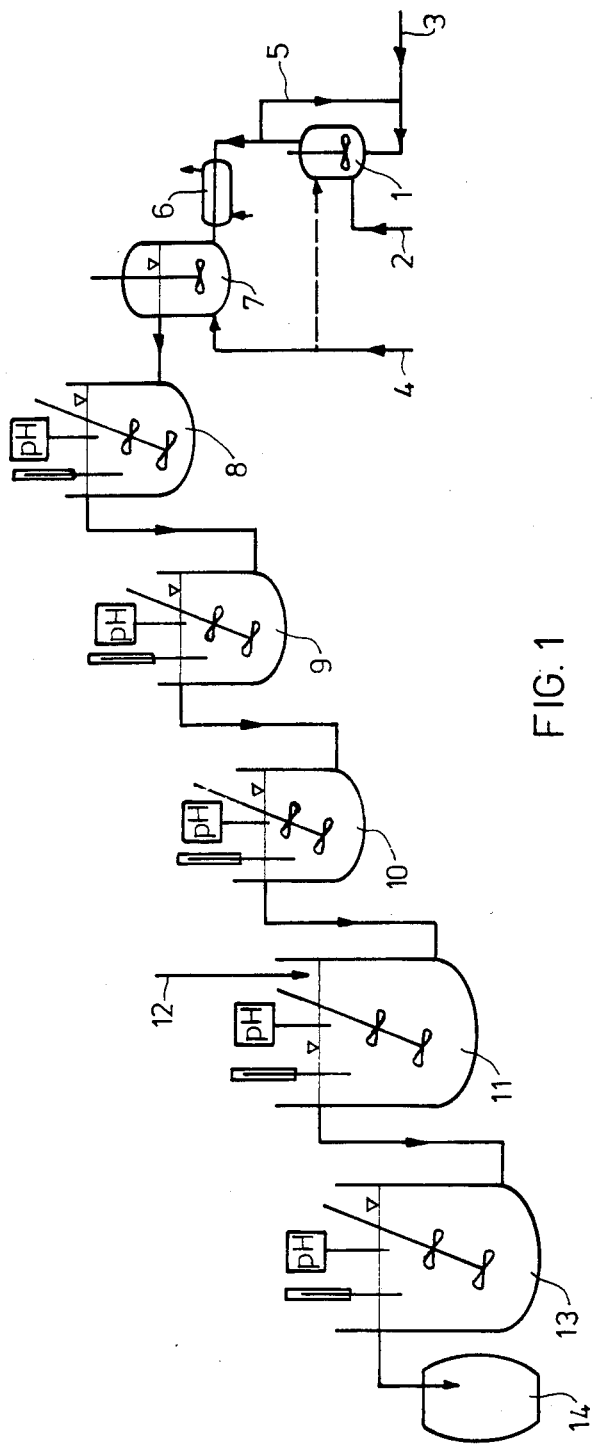

United States Patent [19]

Dahm et al.

[11] Patent Number: 4,761,255
[45] Date of Patent: Aug. 2, 1988

[54] PROCESS FOR THE CONTINUOUS PRODUCTION OF MICROCAPSULES

[75] Inventors: Manfred Dahm, Leverkusen; Gert Jabs, Odenthal; Bernd Koglin, Bergisch-Gladbach; Hildegard Schnöring, Wuppertal, all of Fed. Rep. of Germany

[73] Assignee: Bayer Aktiengesellschaft, Leverkusen, Fed. Rep. of Germany

[21] Appl. No.: 42,223

[22] Filed: Apr. 24, 1987

Related U.S. Application Data

[63] Continuation of Ser. No. 371,595, Apr. 26, 1982, abandoned, which is a continuation of Ser. No. 128,929, Mar. 10, 1980, abandoned.

[30] Foreign Application Priority Data

Mar. 14, 1979 [DE] Fed. Rep. of Germany ....... 2909906

[51] Int. Cl.$^4$ ............................................. B01J 13/02
[52] U.S. Cl. ................................ 264/4.7; 427/213.34; 428/402.21; 428/402.24; 428/914; 503/215
[58] Field of Search ..................... 264/4.7; 427/213.34

[56] References Cited

U.S. PATENT DOCUMENTS

| | | | |
|---|---|---|---|
| 3,432,327 | 3/1969 | Kan et al. | 264/4.7 X |
| 3,577,515 | 5/1971 | Vandegaer | 264/4.7 X |
| 3,816,331 | 6/1974 | Brown, Jr. et al. | 264/4.1 X |
| 4,379,071 | 4/1983 | Schnoring et al. | 264/4.7 |

FOREIGN PATENT DOCUMENTS

2311712 9/1974 Fed. Rep. of Germany ....... 264/4.7

Primary Examiner—Richard D. Lovering
Attorney, Agent, or Firm—Connolly and Hutz

[57] ABSTRACT

A continuous process for the production of microcapsules having polymeric walls and a solid or liquid core which comprises mixing a polyisocyanate with the material to be encapsulated, reacting the resulting mixture, a polyamine, and an aqueous phase containing a dispersion aid, the reaction being initiated in a high-turbulence mixing zone to form an emulsion, and subsequently transferring the reaction product to a multiple-stage cascade of vessels, the temperature being increased from stage to stage and being kept constant during each stage.

4 Claims, 1 Drawing Sheet

PROCESS FOR THE CONTINUOUS PRODUCTION OF MICROCAPSULES

This is a continuation of copending application Ser. No. 371,595, filed Apr. 26, 1982, abandoned, which in turn is a continuation of application Ser. No. 128,929, filed Mar. 10, 1980, abandoned.

It is known that microcapsules can be produced in batches inter alia from polyisocyanates and polyamines by isocyanate polyaddition, i.e. by initially dispersing the material to be encapsulated (core material) and the polyisocyanate in an aqueous solution of a dispersion aid, adding the polyamine to the emulsion and thus forming shells of the polyaddition product around the dispersed organic phase. A suspension of the microcapsules in the aqueous dispersant solution is obtained.

This method is expensive, has poor volume/time yields and gives microcapsules having a wide size distribution and a content of large capsules which is far too great for carbonless copying paper. For carbonless copying papers, the upper limit of the permitted capsule size is determined by the roughness of the paper to which the capsules are to be applied. In practice, this upper limit is 15 to 25 μm. It is desirable to obtain capsules having substantially uniform size just below this limit.

Attempts to remove the oversized capsules from the suspension obtained by the above-described process require an additional process step and involve a considerable loss of yield because there is no commercially workable process for effectively classifying capsule dispersions characterised by wide size ranges. Sufficiently selective separation is not obtained even if the concentration of the suspension is reduced which, again, involves a considerable reduction in yield.

According to German Auslegeschrift No. 2,311,712, it is proposed to produce microcapsules in a one step process by simultaneously, but separately introducing a mixture of polyisocyanate and core material, a polyamine and an aqueous phase into a zone of high turbulence. In this case, too, the microcapsules do not have the ideal size distribution for carbonless copying papers such as a defined upper limit to the particle sizes.

The present invention relates to a continuous process for the production of microcapsules having polymeric capsule walls and a solid or liquid core in which a polyisocyanate is mixed with the material to be encapsulated and the resulting mixture, a polyamine, and an aqueous phase containing a dispersion aid are reacted which process comprises initiating said reaction in a high-turbulence mixing zone with forming of an emulsion, subsequently transferring the reaction product to a multiple stage cascade of vessels, the temperature being increased from stage to stage and being kept constant during each stage.

Unless the temperature is increased in stages, an agglomerate which cannot be further processed is formed. The residence time in the mixing zone is preferably less than 5 minutes and, with particular preference, less than 1 minute, the volume of liquid continuously introduced into the mixing zone being recirculated from 0.3 to 10 times, preferably from 0.5 to 3 times into the mixing zone. This procedure, i.e. recirculating the reacting liquid through the mixing zone, contributes towards preventing the formation of large capsules. The mixing zone may be flanged into a pipe, for example in the form of a small stirrer-equipped vessel or in the form of an in-line mixer, providing technical provision is made for the corresponding recirculation. As the reaction can be initiated with water as well as with a polyamine, the polyamine can be introduced into the mixing zone or be completely or partly fed into the first or second vessel of the cascade. The volume of the first vessel in relation to the volume of the mixing zone may be greater, the lower the concentration of the aqueous polyamine solution. For example, where a 2.5% by weight polyamine solution is used for producing a 20% microcapsule dispersion, the volume of the first vessel may be 25 times greater than that of the mixing zone. Where a 10% polyamine solution is used for producing a 30% suspension, the volume of the first vessel should be 3.5 times greater than that of the mixing zone.

Whereas the temperature in the mixing zone should be in the range of from 0° to 100° C., the temperature in the first vessel should be below 60° C., preferably below 40° C. This applies when the polyamine is introduced into the first vessel of the cascade. When the polyamine is introduced into the mixing zone, the temperature should not exceed 50° C. either in the mixing zone or in the first vessel.

According to the present invention, the reaction time may be reduced without agglomerating the capsules by increasing the temperature from stage to stage of the cascade up to a maximum temperature with relatively long residence times at each of the temperatures adjusted. Accordingly, the suspension issuing from the mixing zone is passed through a multistage cascade of vessels, the successive vessels each having a constant temperature which increases in stages to the maximum temperature in the downstream direction. For a given average residence time, the highest possible temperature in each stage at which no agglomeration occurs may readily be determined for each vessel by a preliminary test. The pH-value of the solution is a measure of the progress of the polyaddition reaction. Accordingly, the temperatures at which agglomeration begins are determined at different pH-values after which the pH-value and maximum permitted temperature may at that pH-value be immediately associated with one another. In general, residence times of from 15 to 25 minutes per vessel are sufficient when the temperature is increased in steps from 8°–15° C. to 60°–70° C. in the last vessel.

In that vessel of the cascade in which the pH-falls below a value of 7, vigorous foaming occurs. This foaming may be controlled in a conventional way, for example by adding an anti-foam agent or by running off the suspension from the bottom of a vessel with a pump and spraying it onto the surface of the dispersion in the same vessel or in the next vessel. In one preferred embodiment of the present invention, the pH is prevented from falling below a value of 7 by automatic titration with lye or lye formers. In this way, no foaming occurs, in spite of which neither the reaction nor the subsequent behaviour of the microcapsules is adversely affected.

Suitable polyisocyanates are, in principle, any known polyisocyanates, for example tolylene diisocyanate, xylylene diisocyanate (an example of a suitable aromatic polyisocyanate), and hexamethylene diisocyanate (as an example of aliphatic polyisocyanates). It is also possible to use NCO prepolymers, i.e. reaction products of polyisocyanates with diols or polyols which still contain at least two free terminal NCO groups. It is particularly preferred to use oxadiazintrione-based and biuret-based isocyanates, i.e. reaction products of diisocyanates, for example hexamethylene diisocyanate reacted on its own to form cyclic structures.

Suitable polyamines are aromatic or aliphatic primary and secondary diamines and polyamines. It is preferred to use aliphatic diamines and polyamine, such as 1,2-ethylene diamine, bis-(3-aminopropyl)-amine, hydrazine, 2-hydrazine, ethanol, bis-(2-methylaminoethyl)-methyl amine, 1,4-diamino-cyclohexane, 3-amino-1-methylamino propane, N-hydroxyl ethyl ethylene diamine, N-methyl-bis-(3-aminopropyl)-amine, 1,4-diamino-n-butane, 1,6-diamino-n-hexane, 1,2-ethylene diamine-N-ethane sulphonic acid (in the form of an alkali salt), 1-aminoethyl- 1,2-ethylene diamine. Hydrazine and its salts are also regarded as diamines in the context of the present invention. All parts and percentages used herein and in the forthcoming examples are by weight.

EXAMPLE 1

The apparatus used is illustrated in FIG. 1.

100 kg/h of a 0.5% by weight aqueous dispersant solution having a temperature of 10° C. and 60 kg/h of a solution of 5% by weight of crystal violet lactone (colorant) and 15% by weight of a polyisocyanate (based on oxadiazintrione, 21% by weight NCO content) in diisopropyl napthalene having a temperature of 20° C. are continuously introduced into the first mixing zone (1) (volume 1 liter) through the inlets (3) and (2) respectively. This corresponds to a residence time of approximately 0.4 minute.

A volume stream of 500 liters per hour is pumped in a circuit through the pipe system (5). A constant liquid stream of the emulsion formed is introduced into the second mixing zone (7) (volume 5 liters) through the heat exchanger (6), in which it is cooled to 30° C., whilst at the same time 28 kg/h of an aqueous solution of 3.05% by weight of diethylene triamine and 1.72% by weight of ethylene diamine is introduced through the inlet (4). The average residence time in the second mixing zone is just 2 minutes.

From the second mixing zone (7), the microcapsule suspension formed therein flows into the stirrer-equipped vessel (8) (capacity 50 liters; residence time 16 minutes) at 35° C., then into the vessel (9) (capacity 50 liters; residence time 16 minutes) at 40° C. and, finally, into the stirrer-equipped vessel (10) (capacity 50 liters; residence time 16 minutes) at 50° C. Thereafter, the microcapsule suspension passes at 60° C. through the vessels (11) and (13) (capacity 320 liters; residence time in each approximately 1.7 hours), in which it is slowly stirred, in order to complete the reaction. In the vessel (11), the pH value is adjusted to exactly 7 by the addition of sodium hydroxide through the inlet (12). The fully reacted microcapsule suspension is removed at the outlet (14).

EXAMPLE 2

The procedure is as described in Example 1, except that 179 kg/h of a 0.5% aqueous dispersant solution at 30° C. and 96 kg/h of a solution of 5% by weight of N-benzoyl leucomethylene blue and 15% by weight of the NCO diisocyanate of Example 1 are used. The volumes of the mixing zones are the same. The vessel volumes of the heating zone are doubled. The residence-time zone is increased by a third vessel of the same volume.

EXAMPLE 3

The aqueous phase is a 0.5% aqueous dispersant solution. The organic phase is a solution of 15% of a product based on oxadiazintrione containing 21% by weight of NCO groups and 3.1% of a colorant in a solvent mixture of 4 part of diisopropyl naphthalene and 1 part of isoparaffin. 179 kg/h of the aqueous phase tempered to 25° C. and 96 kg/h of the organic phase tempered to 25° C. are continuously introduced into the first mixing zone (volume 1 liter) where they are mixed with 22 kg/h of a 5.5% aqueous chain-extender solution of 62.5% of diethylene triamine and 37.5% of ethylene diamine having a temperature of 25° C. The average residence time in the first mixing zone is 0.20 minute.

A pump (not shown) circulates a volume stream of 500 liters per hour through this mixing zone. At the same time, a constant stream of 297 kg/h of capsule dispersion flows at a temperature of 35° C. into a 300 liter capacity residence time vessel tempered to 35° C. (average residence time 1 h) and from there into the second mixing zone (capacity 6 liters). In this second mixing zone, it is mixed with another 22 kg/h of the 5.5% aqueous chain extender solution having a temperature of 25° C. The average residence time in the second mixing zone is 1.1 minutes and the temperature 34° C.

The microcapsule suspension is then passed through four heating vessels each 100 liters in capacity and having temperatures of 36° C., 44° C., 52° C. and 60° C., respectively, and is thus brought to the final temperature of 60° C. at which it is passed through three residence-time vessels each 300 liters in capacity, the pH being kept constant at a value of 7.

What is claimed is:

1. In a continuous process for the production of microcapsules having polymeric walls encapsulating a solid or liquid core material in which a polyisocyanate is dispersed with the material to be encapsulated and then reacted with a polyamine in an aqueous phase containing a dispersion aid, the improvement which comprises forming a reaction mixture emulsion in a high turbulence mixing zone which has an average residence time in the mixing zone of less than 5 minutes while continuous recirculating the reaction mixture through the mixing zone from 0.3 to 10 times, and subsequently completing the reaction in the mixture by transferring the reaction mixture emulsion through a multiplestage cascade of a series of individual vessels with the temperature in each individual vessel being kept constant and with the temperature progressively increasing from vessel to vessel.

2. A process, as claimed in claim 1, including a post-reaction for completing the reaction in a zone consisting of a vessel or a cascade of vessels.

3. A process, as claimed in claim 1, wherein the pH is kept at, or does not fall below, a value of 7.

4. A process, as claimed in claim 1, wherein the reaction mixture has a residence time in the mixing zone of less than one minute and is recirculated through the mixing zone 0.5 to 3 times.

* * * * *